US006781754B2

(12) United States Patent
Zhao

(10) Patent No.: US 6,781,754 B2
(45) Date of Patent: Aug. 24, 2004

(54) INTERLEAVER USING SPATIAL BIREFRINGENT ELEMENTS

(75) Inventor: Bin Zhao, Irvine, CA (US)

(73) Assignee: Cirvine Corporation, Irvine, CA (US)

( * ) Notice: Subject to any disclaimer, the term of this patent is extended or adjusted under 35 U.S.C. 154(b) by 0 days.

(21) Appl. No.: 09/876,368

(22) Filed: Jun. 7, 2001

(65) Prior Publication Data

US 2001/0055134 A1 Dec. 27, 2001

Related U.S. Application Data

(60) Provisional application No. 60/210,050, filed on Jun. 7, 2000.

(51) Int. Cl.[7] ................................................. G02B 5/30
(52) U.S. Cl. ........................ 359/497; 359/129; 359/495; 359/496; 385/36
(58) Field of Search ........................... 359/117, 124, 359/127, 128, 129, 494, 495, 496, 497, 900; 385/31, 36

(56) References Cited

U.S. PATENT DOCUMENTS

| | | | |
|---|---|---|---|
| 4,247,166 A | 1/1981 | Yeh | 350/374 |
| 4,500,178 A | 2/1985 | Yeh | 350/404 |
| 4,548,479 A | 10/1985 | Yeh | 350/404 |
| 5,062,694 A | 11/1991 | Blair | 359/498 |
| 5,471,340 A | 11/1995 | Cheng et al. | 359/281 |
| 5,574,596 A | 11/1996 | Cheng | 359/484 |
| 5,606,439 A | 2/1997 | Wu | 349/117 |
| 5,682,446 A | 10/1997 | Pan et al. | 385/11 |
| 5,694,233 A | 12/1997 | Wu et al. | 359/117 |
| 5,724,165 A | 3/1998 | Wu | 359/117 |
| 5,818,981 A | 10/1998 | Pan et al. | 385/11 |
| 5,867,291 A | 2/1999 | Wu et al. | 359/124 |
| 5,978,116 A | 11/1999 | Wu et al. | 359/124 |
| 6,005,697 A | 12/1999 | Wu et al. | 359/117 |
| 6,049,427 A | 4/2000 | Bettman | 359/484 |
| 6,212,313 B1 * | 4/2001 | Li | |

OTHER PUBLICATIONS

Pp. 10–29 from book believed to be entitled *Electromagnetic Theory*. No further information on book is available.
Carl F. Buhrer; *Synthesis and tuning of high-order Solc-type birefringent filters*, Applied Optics, Apr. 20, 1994, vol. 33, No. 12, pp. 2249–2254.
Tatsuya Kimura, Masatoshi Saruwatari; *Temperature Compensation of Birefringent Optical Filters*; Proceeding Letters, Aug. 1971, pp. 1273–1274.
Carl F. Buhrer; *Four waveplate dual tuner for birefringent filters and multiplexers*; Applied Optics, Sep. 1, 1987, vol. 26, No. 17, pp. 3628–3632.
P. Melman, W. J. Carlsen, B. Foley; *Tunable Birefringent Wavelength—Division Multiplexer/Demultiplexer*, Electronics Letters, Jul. 18, 1985, vol. 21, No. 15, pp. 634 and 635.
Yohji Fujii; *Tunable wavelength multi/demultiplexer using a variable retardation phase plate*; Applied Optics, Aug. 20, 1990, vol. 29, No. 29.

(List continued on next page.)

Primary Examiner—Audrey Chong
Assistant Examiner—Craig Curtis

(57) ABSTRACT

An interleaver has an input polarization beam displacer, a birefringent filter assembly in optical communication with the input polarization beam displacer, a first output polarization beam displacer in optical communication with the birefringent filter assembly and a second output polarization beam displacer optical communication with the first output polarization beam displacer. The birefringent filter assembly preferably comprises at least one birefringent filter stage, wherein each birefringent filter stage comprises a first filter polarization beam displacer, a second filter polarization beam displacer and at least one reflector configured so as to direct light from first filter polarization beam displacer to the second filter of polarization beam displacer.

24 Claims, 6 Drawing Sheets

OTHER PUBLICATIONS

S.E. Harris, E.O. Ammann, I. C. Chang; *Optical Network Synthesis Using Birefringent Crystals. I Synthesis of Lossless Networks of Equal–Length Crystals*, Journal Of The Optical Society Of America, Oct. 1964, vol. 564, No. 10, pp. 1267–1279.

Tatsuya Kimura, Masatoshi Saruwatari, and Kenju Otsuka; *Birefringent Branching Filters for Wideband Optical FDM Communications;* Applied Optics, Feb. 1973, vol. 12, No. 4, pp. 373 to 379.

Godfrey R. Hill; *Wavelength Domain Optical Network Techniques;* Proceedings of the IEEE, Jan. 1989, vol. 77, No. 1, pp. 121 to 132.

J. M. Senior, S.D. Cusworth; *Devices for Wavelength Multiplexing and Demultiplexing;* IEE Proceedings, Jun. 1989, vol. 136, Pt. J. No. 3, pp. 183–202.

* cited by examiner

INTERLEAVER USING SPATIAL BIREFRINGENT ELEMENTS

CROSS-REFERENCE TO RELATED APPLICATIONS

This patent application claims the benefit of the filing date of U.S. Provisional Patent Application Ser. No. 60/210,050, filed on Jun. 7, 2000 and entitled APPARATUS FOR SIGNAL INTERLEAVING, the entire contents of which are hereby expressly incorporated by reference.

This patent application is related to co-pending patent application Ser. No. 09/876,484, filed on Jun, 7, 2001 entitled LOW CROSSTALK FLAT BAND FILTER; co-pending patent application Ser. No. 09/876,602, filed Jun. 7, 2001 entitled BIREFRINGENT DEVICES; co-pending patent application Ser. No. 09/876,819, filed on Jun. 7, 2001 entitled COMB FILTER FOR DENSE WAVELENGTH DIVISION MULTIPLEXING; co-pending patent application Ser. No. 09/876,647, filed on Jun. 7, 2001 entitled APPARATUS AND METHOD FOR LOW DISPERSION IN COMMUNICATIONS; all filed on the instant date herewith and commonly owned by the Assignee of this patent application, the entire contents of all which are hereby expressly incorporated by reference.

FIELD OF THE INVENTION

The present invention relates generally to optical devices and relates more particularly to a high performance filter or interleaver for optical communications and the like.

BACKGROUND OF THE INVENTION

Optical communication systems which utilize wavelength-division multiplexing (WDM) and dense wavelength-division multiplexing (DWDM) technologies are well known. According to both wavelength-division multiplexing and dense wavelength-division multiplexing, a plurality of different wavelengths of light, preferably infra-red light, are transmitted via a single medium such as an optical fiber. Each wavelength corresponds to a separate channel and carries information generally independently with respect to the other channels. The plurality of wavelengths (and consequently the corresponding plurality of channels) are transmitted simultaneously without interference with one another, so as to substantially enhance the transmission bandwidth of the communication system. Thus, according to wavelength-division multiplexing and dense wavelength-division multiplexing technologies, a much greater amount of information can be transmitted than is possible utilizing a single wavelength optical communication system.

The individual channels of a wavelength-division multiplexed or dense wavelength-division multiplexed signal must be selected or separated from one another at a receiver in order to facilitate detection and demodulation thereof. This separation or demultiplexing process can be performed or assisted by an interleaver. A similar device facilitates multiplexing of the individual channels by a transmitter.

It is important that the interleaver separate the individual channels sufficiently so as to mitigate undesirable crosstalk therebetween. Crosstalk occurs when channels overlap, i.e., remain substantially unseparated, such that some portion of one or more non-selected channels remains in combination with a selected channel. As those skilled in the art will appreciate, such crosstalk interferes with the detection and/or demodulation process. Generally, the effects of crosstalk must be compensated for by undesirably increasing channel spacing and/or reducing the communication speed, so as to facilitate reliable detection/demodulation of the signal.

However, as channel usage inherently increases over time, the need for efficient utilization of available bandwidth becomes more important. Therefore, it is highly undesirable to increase channel spacing and/or to reduce communication speed in order to compensate for the effects of crosstalk. Moreover, it is generally desirable to decrease channel spacing and to increase communication speed so as to facilitate the communication of a greater quantity of information utilizing a given bandwidth.

Modern dense wavelength-division multiplexed (DWDM) optical communications and the like require that network systems offer an ever-increasing number of channel counts, thus mandating the use of a narrower channel spacing in order to accommodate the increasing number of channel counts. The optical interleaver, which multiplexes and demultiplexes optical channels with respect to the physical media, i.e., optical fiber, offers a potential upgrade path, so as to facilitate scalability in both channel spacing and number of channel counts in a manner which enhances the performance of optical communication networks.

As a multiplexer, an interleaver can combine two streams of optical signals, wherein one stream contains odd channels and the other stream contains even channels, into a single, more densely spaced optical signal stream. As a demultiplexer, an interleaver can separate a dense signal stream into two, wider spaced streams, wherein one stream contains the odd channels and the other stream contains the even channels. Thus, the interleaver offers scalability which allows contemporary communication technologies that perform well at wider channel spacing to address narrower, more bandwith efficient, channel spacings.

There are four basic types of interleavers suitable for multiplexing and demultiplexing optical signals. These include birefringent filters, thin-film dielectric devices, planar waveguides, and fiber-based devices. All of these contemporary interleaving technologies suffer from substantial limitations with respect to channel spacing, dispersion, insertion loss, channel isolation, temperature stability, cost, reliability and flexibility. For example, most commercially available interleavers provide only 100 GHz and 50 GHz channel spacings. Reduction of channel spacing to 25 GHz, 12.5 GHz and beyond appears to be difficult and challenging.

Thus, there is a need to provide an optical interleaver which can overcome or mitigate at least some of the above-mentioned limitations.

SUMMARY OF THE INVENTION

The present inventions specifically addresses and alleviates the abovementioned deficiencies associated with the prior art. More particularly, the present invention comprises an interleaver comprising an input polarization beam separation element, a birefringent filter assembly in optical communication with the input polarization beam separation element, and an output polarization beam separation/combination element assembly in optical communication with the birefringent filter assembly. The birefringent filter assembly comprises at least one birefringent filter stage. The input polarization beam separation element, the birefringent filter assembly, and the output polarization beam separation/combination element assembly are configured to minimize feedback to input source and transmission losses.

According to the present invention birefringent crystals, such as those commonly used in contemporary birefringent filters, are eliminated so as to mitigate at least some of the problems associated with prior art interleavers. Rather than using birefringent crystals, the interleaver of the present invention utilizes a device which provides optical paths having different optical path lengths for two orthogonally polarized light beams so as to provide a birefringent effect.

These, as well as other advantages of the present invention, will be more apparent from the following description and drawings. It is understood that changes in the specific structure shown and described may be made within the scope of the claims without departing from the spirit of the invention.

BRIEF DESCRIPTION OF THE DRAWINGS

These, and other features, aspects and advantages of the present invention will be more fully understood when considered with respect to the following detailed description, appended claims and accompanying drawings, wherein:

DETAILED DESCRIPTION OF THE INVENTION

Figure 1:
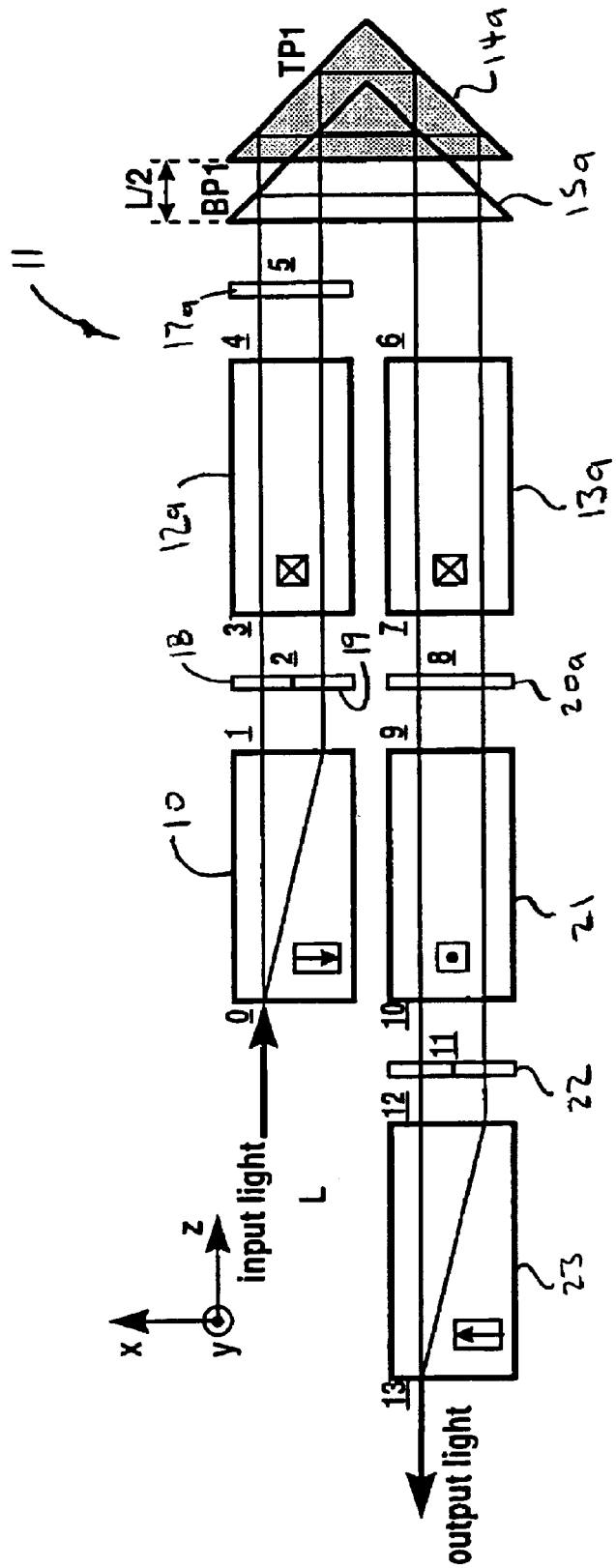
FIG. 1 is a schematic diagram of a one-stage birefringent filter or interleaver according to the present invention.

The detailed description set forth below in connection with the appended drawings is intended as a description of the presently preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The description contained herein is directed primarily to the configuration of an interleaver as a demultiplexer. However, as those skilled in the art will appreciate, the present invention may be used in both demultiplexers and multiplexers. The difference between demultiplexers and multiplexers is small and the configuration of the present invention as either desired device is well within the ability of one of the ordinary skill in the art.

Two different reference systems are used in this patent application for the determination of angular orientations. One reference system is used for the determination of the angular orientations of birefringent elements, such as birefringent crystals, with respect to the polarization direction of input light. Another reference system is used for the determination of the angular orientations of birefringent elements and the angular orientations of waveplates with respect to a moving (x, y, z) coordinate system. Thus, for the birefringent element angular orientations, two separate reference systems are utilized. Thus, when reading the detailed description below, it will be very helpful to understand these two reference systems.

When angular orientation of birefringent element is discussed, the angular orientation is typically the fast axis of the birefringent element with respect to the polarization direction of incoming light just prior to the incoming light reaching the birefringent element. Determination of the angular orientation is made by observing oncoming light with the convention that the angle is positive if the rotation of the fast axis is clockwise with respect to the polarization direction of the oncoming light and is negative if the rotation is counter-clockwise with respect to the polarization direction of the oncoming light.

If there is a series of birefringent elements, such as in a birefringent filter, the angular orientations of each of the elements of the filter are measured by their fast axes with respect to the polarization direction of incoming light just prior to the incoming light reaching the first birefringent element of the filter. If there are more than one birefringent filters in a sequence, then the angular orientations are determined separately for each birefringent filter (the angular orientations are measured with respect to the polarization direction of incoming light just prior to the incoming light reaching the first birefringent element of each different filter). Thus, each birefringent filter has its own independent reference for the determination of the angular orientations of the birefringent elements thereof.

By the way of contract, the angular orientation of birefringent elements and angular orientations of waveplates are also measure by the fast axes of birefringent elements and the optic axes of waveplates with respect to the +x axis. However, it is very important to appreciate that the +x axis is part of the moving coordinate system. This coordinate system travels with the light, such that the light is always traveling in the +z direction and such that the +y axis is always up as shown in the drawings. Thus, when the light changes direction, the coordinate system rotates with the +y axis thereof so as to provide a new coordinate system. The use of such a moving coordinate system allows the optical beam states, the birefringent elements, and the waveplates to be viewed in a consistent manner at various locations in the devices, i.e., always looking into the light, and therefore substantially simplifies viewing and analysis of the devices.

Determination of the angular orientations in (x, y, z) coordinate system is made by observing oncoming light with the convention that the angle is positive if the rotation of the corresponding optical axis is counter-clockwise with respect to +x axis and is negative if the rotation is clockwise with respect to the +x axis (which is consistent the conventional use of (x, y, z) coordinate system, but which is contrary to the sign convention for determining the angular orientations of birefringent elements with respect to the input polarization direction, as discussed above).

As those skilled in the art will appreciate, an interleaver is an optical device which typically includes at least one birefringent filter. Further, a birefringent filter is one example of a comb filter.

More particularly, the present invention comprises an interleaver comprising an input polarization beam displacer, a birefringent filter assembly in optical communication with the input polarization beam displacer, a first output polarization beam displacer in optical communication with the birefringent filter assembly and a second output polarization beam displacer in optical communication with the first output polarization beam displacer. The birefringent filter assembly comprises at least one birefringent filter stage. Each birefringent filter stage comprises a first filter polarization beam displacer, a second filter polarization beam displacer and at least one reflector configured to direct light from the first filter polarization beam displacer to the second filter polarization beam displacer. The whole device is configured so as to minimize feedback to the input source as well as to minimize the signal transmission losses.

Preferably, the reflectors comprise prisms. The reflectors may alternatively comprise mirrors or etalons.

According to one aspect of the present invention, two prisms or two sets of reflectors or mirrors are utilized so as to define two paths, wherein each path has a different physical length. Alternatively, the two paths may have the same physical length and may have different optical path lengths, such as by utilizing materials having different indices of refraction in the two paths. Further, any desired combination of variation in physical path length and index of refraction between the first and second paths may be utilized.

Thus, each of the birefringent filter stages define first and second paths and a single prism may optionally be utilized to direct light from the first polarization beam displacer to the second polarization beam displacer of each stage, wherein a material is inserted into at least one of the first and second paths such that the material causes the first and second paths to have different optical path lengths.

Each birefringent filter stage preferably further comprises a half-wave waveplate intermediate each reflector and the first filter polarization beam displacer thereof. Alternatively, the half-wave waveplate may be disposed intermediate each reflector and the second filter polarization beam displacer. The half-wave waveplate disposed intermediate the reflector and the first filter polarization beam displacer preferably has an optical axis thereof oriented at approximately 45° with respect to the +x axis at that location.

The interleaver preferably further comprises a first input half-wave waveplate disposed intermediate the input polarization beam displacer and the birefringent filter assembly. The first input half-wave waveplate is configured so as to transmit a non-displaced beam (a beam which was not displaced by the input polarization beam displacer) therethrough. Similarly, the interleaver preferably further comprises a second input half-wave waveplate disposed intermediate the input polarization beam displacer and the birefringent filter assembly. The second input half-wave waveplate is preferably configured so as to transmit a displaced beam (a beam which was displaced by the input polarization beam displacer) therethrough. The first input half-wave waveplate preferably has an optical axis thereof oriented at 22.5° with respect to the +x axis at that location. The second input half-wave waveplate preferably has an optical axis thereof oriented at −22.5° with respect to the +x axis at that location.

Preferably, a first half-wave waveplate is configured to receive an output of each second filter polarization beam displacer.

The interleaver preferably further comprises a first half-wave waveplate disposed intermediate the first output polarization beam displacer and the second output polarization beam displacer.

Similarly, the interleaver preferably further comprises a second half-wave waveplate disposed intermediate the first output polarization beam displacer and the second output polarization beam displacer.

Similarly, the interleaver preferably further comprises a third half-wave waveplate disposed intermediate the first output polarization beam displacer and the second output polarization beam displacer.

Similarly, the interleaver preferably further comprises a fourth half-wave waveplate disposed intermediate the first output polarization beam displacer and the second output polarization beam displacer.

The interleaver may comprise one, two, three, four, five or more birefringent filter stages, as desired. As those skilled is the art will appreciate, additional birefringement filter stages provide enhanced transmission filter characteristics.

The input polarization beam displacer, the birefringent filter assembly, the first output polarization beam displacer and the second output polarization beam displacer are preferably all configured so as to facilitate interleaving of a plurality of beams simultaneously, preferably so as to facilitate the interleaving of an arrayed plurality of beams simultaneously.

Those skilled in the art will appreciate that various other devices, other than an input polarization beam displacer, may similarly be utilized so as to separate a composite input beam into two orthogonally polarized component beams. For example, a polarization beam splitter and a mirror may similarly be utilized.

In a like manner, devices other than output polarization beam displacers may be utilized so as to separate and recombine the beams from the birefringent filter assembly into a pair of composite beams. For example, polarization beam splitters may be so utilized.

Referring now to FIG. 1, a one-stage interleaver constructed according to the present invention comprises an input polarization beam displacer 10, a birefringent filter assembly 11 in optical communication with the input polarization beam displacer 10, a first output polarization beam displacer 21 in optical communication with the birefringent filter assembly 11 and a second output polarization beam displacer 23 in optical communication with the first output polarization beam displacer 21. The birefringent filter assembly 11 comprises a first filter polarization beam displacer 12a, a second filter polarization beam displacer 13a, and at least one reflector configured to direct light from the first filter polarization beam displacer 12a to the second filter polarization beam displacer 13a. According to one configuration of the present invention, the reflectors comprise two prisms 14a and 15a, which are configured so as to define two different paths between the first filter polarization beam displacer 12a and the second filter polarization beam displacer 13a, wherein each of the two paths have a different optical path length. Alternatively, mirrors may similarly be utilized so as to define the first and second paths.

As shown in FIG. 1, the two prisms 14a and 15a have different distances between themselves and the first filter polarization beam displacer 12a and the second filter polarization beam displacer 13a. This difference in distances is L/2, which provides a difference in physical path lengths of the two paths of L.

Rather than having two prisms (or sets of mirrors) which define two paths having different physical path lengths, a single prism may alternatively be utilized so as to define two paths having the same physical path length and materials having different indices of refraction may be inserted into one or both of the two paths so as to define paths having different optical path lengths.

Preferably, each birefringent filter stage further comprises a half-wave waveplate 17 disposed intermediate each reflector and the first filter polarization beam displacer 12. Each quarter-wave waveplate 17 preferably has an optical axis thereof oriented at approximately 45° with respect to the +x axis at that location.

The interleaver preferably further comprises a first input half-wave waveplate 18 disposed intermediate the input polarization beam displacer 10 and the birefringent filter assembly 11 and configured so as to transmit a non-displaced beam therethrough. Similarly, the interleaver preferably further comprises a second input half-wave waveplate 19 disposed intermediate the input polarization beam displacer 10 and the birefringent filter assembly 11 and configured so as to transmit a displaced beam therethrough. The first half-wave waveplate preferably has an optical axis thereof oriented at 22.5° with respect to the +x axis at that location and the second input half-wave waveplate 19 preferably has an optical axis thereof oriented at −22.5° with respect to the +x axis at that location.

Each birefringent filter stage of the interleaver preferably further comprises a half-wave waveplate 20 configured to receive an output thereof.

The interleaver preferably further comprises four half-wave waveplates 22 disposed intermediate a first output polarization beam displacer 21 and a second output polarization beam displacer 23. The first half-wave waveplate 22 preferably has optic axis orientation of approximately 0° with respect to the +x axis at that location. The second half-wave waveplate 22 preferably has an optic axis orientation of approximately 45° with respect to the +x axis at that location. The third half-wave waveplate 22 preferably has an optic axis orientation of approximately 45° with respect to the +x axis. The fourth half-wave waveplate 22 preferably has an optic axis orientation of approximately 90° with respect to the +x axis at that location.

Figure 3:
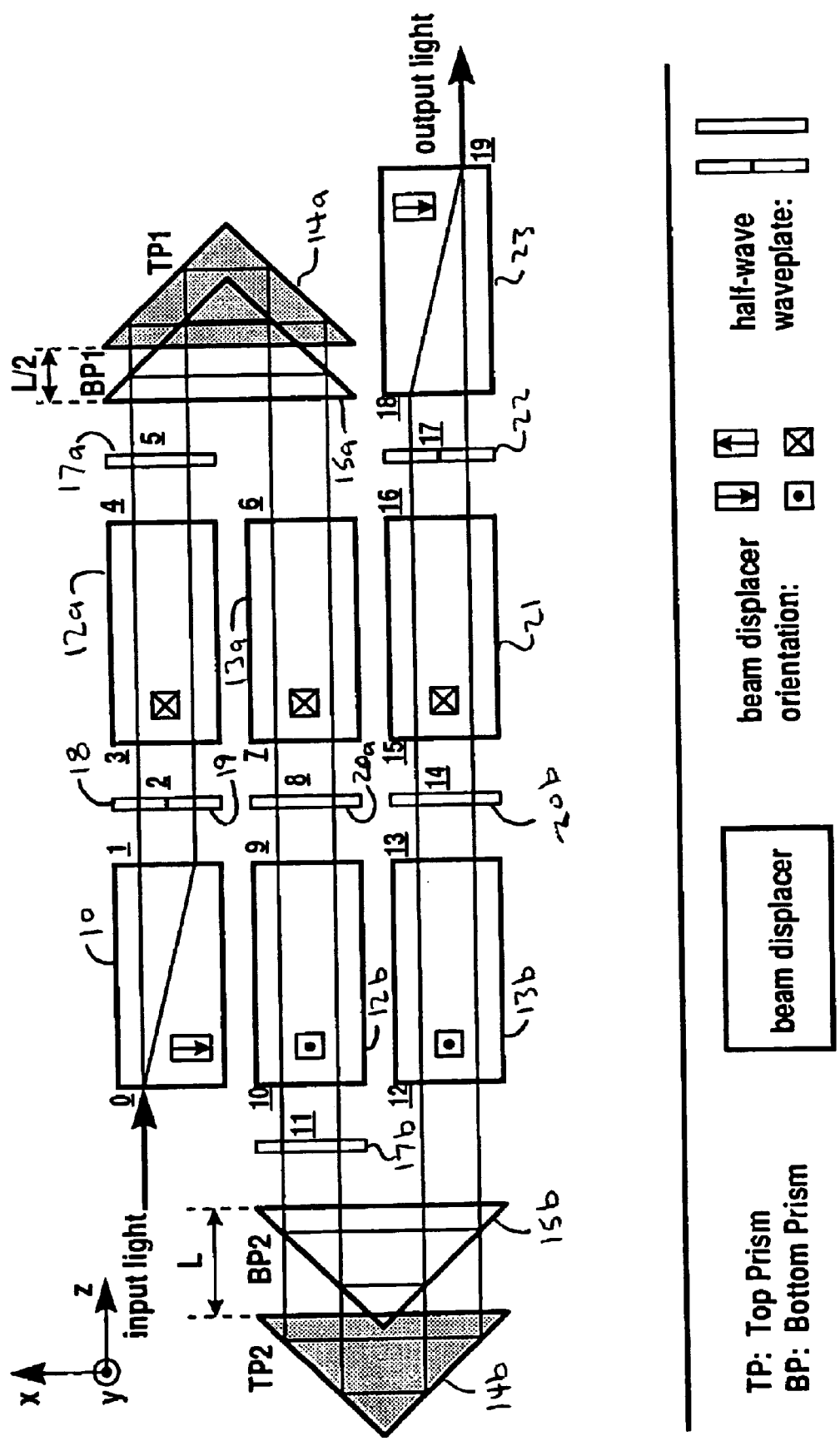
FIG. 3 is a schematic diagram of a two-stage birefringent filter or interleaver according to the present invention.
Figure 5:
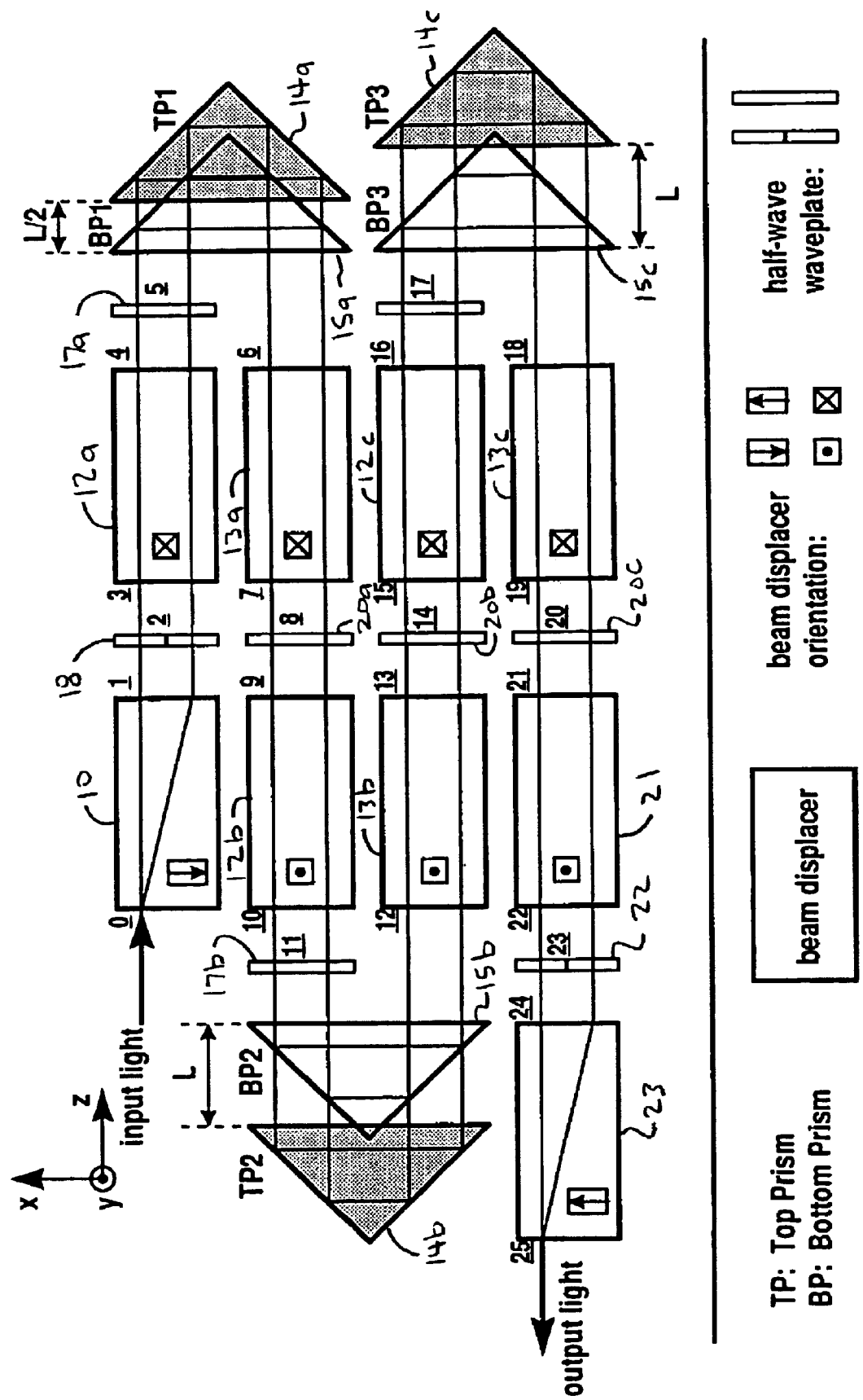
FIG. 5 is a schematic diagram of a three-stage birefringent filter interleaver according to the present invention.

The birefringent filter assembly may comprise one birefringent filter stage (as shown in FIG. 1), two birefringent filter stages (as shown in FIG. 3), three birefringent filter stages (as shown in FIG. 5), four birefringent filter stages, five birefringent filter stages or more birefringent filter stages, as desired.

FIGS. 1, 3 and 5 show the interleaver having various different numbers of birefringent filter stages. In each of FIGS. 1, 3 and 5, the components of the first birefringent filter stage have an "a" following the component number thereof, the components of the second birefringent filter stage have the letter "b" following the number of the component thereof and so on. Thus, like components within each different stage have the same number, but have a different letter which indicates which stage they are part of. For example, the first filter polarization beam displacer is always number 12, regardless of which stage it is in, and is followed by the letter "a" (to form the reference number "12a") when in the first stage and is followed by the letter "b" (to form the reference number "12b") when in the second stage, and so on. When a component is referred to generically, i.e., without regard as to which specific stage the component is part of, then the letter may be omitted.

FIG. 1 shows a schematic of a one-stage interleaver. A right-hand coordinate system of axes is used to characterize the optical beam propagation and the system at various locations with a convention that the light is always propagating in the +z direction and the +y direction is always out of the paper for FIG. 1.

Figure 2:
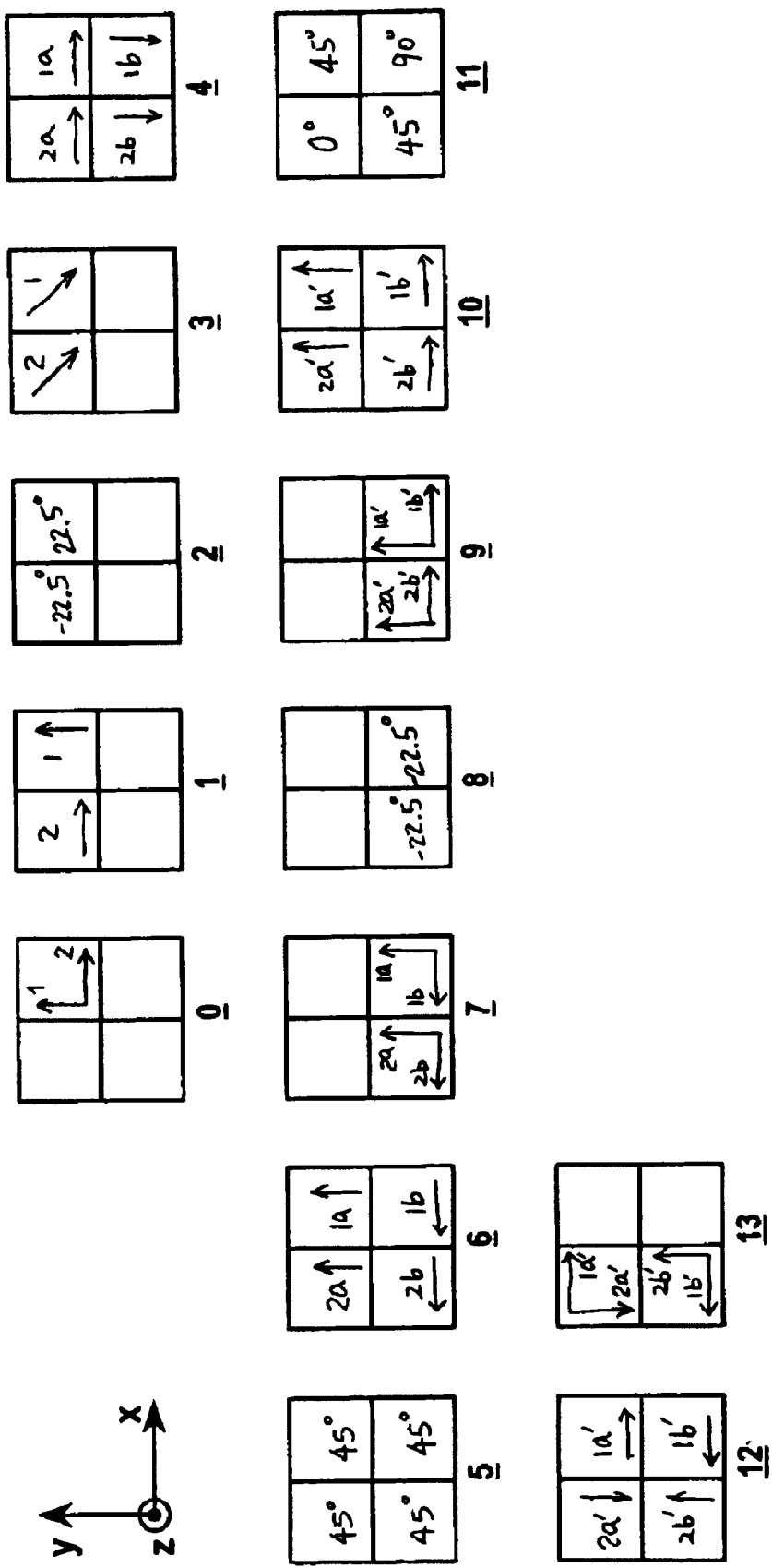
FIG. 2 is a series of frames showing the optical beam states and the half-wave waveplate orientations at different locations for the interleaver shown in FIG. 1.

Referring now to FIG. 2, the optical beam states and the half-wave waveplate orientations at various locations are schematically shown. In FIG. 2, each of the four boxes of a frame corresponds to a beam position at various locations. The four boxes are oriented as the beams would appear looking into oncoming light. The polarization beam displacers shift the optical beams to various positions or boxes, according to the orientation of the polarization beam displacer and the optical beam polarization. As those skilled in the art will appreciate, polarization beam splitters and/or mirrors may alternatively be use to shift the optical beams to various positions or boxes.

At location 0, an input composite optical beam has two linearly polarized components 1 (along the y direction and z along the x direction) at the top-right beam position. After the beam propagates through the first polarization beam displacer at location 1, component 2 shifts to the top-left beam position and component 1 remains at the top-right beam position. The arrows shown on the beam displacers indicate the beam shift direction for the polarization beam displacers. After components 1 and 2 pass through two half-wave waveplates at location 2, the linearly polarized components 1 and 2, respectively, polarize along the same direction, i.e., −45° with respect to the +x axis, at location 3. At location 2, the optical axis of the half-wave waveplate for component 1 is oriented at 22.5° with respect to the +x axis and the optical axis of the half-wave waveplate for component 2 is oriented at −22.5° with respect to the +x axis.

When component 1 enters the second beam displacer, the light components polarized along the y direction move to the bottom beam locations and the light components polarized along the x direction remain at their corresponding top beam positions at location 4. A half-wave waveplate 17a or four half-wave waveplates are used at location 5 and have orientations of 45° with respect to the +x axis. After the optical beams pass through this half-wave waveplate 17a, the polarization directions are changed by 90°.

There are two right-angle prisms, 14a and 15a. Prism 14a is a top prism as looking down at FIG. 1 and prism 15a is a bottom prism as looking down on FIG. 1. As discussed above, there is a position difference between the two prisms of L/2. Therefore, the optical beams which follow the two optical paths travel different lengths. The optical beams at the top beam positions are deflected twice by the first prism 14a before arriving at location 6. The optical beams at the bottom beam positions are deflected twice by the second prism 15a before arriving at location 6. The optical beam states are shown in FIG. 2 at location 6. Because of the position difference between the top prism 14a and the bottom prism 15a, there is a phase difference $\Gamma$ between the top beams and the bottom beams at location 6, according to the equation: $\Gamma = L \cdot 2\pi/\lambda$, where $\lambda$ is the optical wavelength.

After light passes through the second filter polarization beam displacer, component 1a moves to the bottom-right beam position to combine with component 1b and component 2a moves to the bottom-left beam position to combine with component 2b at location 7. Then, the light passes through another half-wave waveplate 20a at location 8, where the half-wave waveplate 20a is oriented at −22.5°. This changes the polarization directions of the optical beams and the new x and y components are shown in FIG. 2 at location 9. After the optical beams pass through the first output polarization beam displacer 21, component 1a' moves to the top-right beam position and component 2a' moves to the top-left beam position at location 10. Four half-wave waveplates 22 are used at location 11, with their corresponding orientations as shown in frame 11 of FIG. 2. After the optical beams pass through the waveplates 22, their polarization directions are shown in FIG. 2 at location 12.

When the light passes through the second output polarization beam displacer 23, component 1a' moves to the top-left beam position to combine with component 2a' and component 1b' moves to the bottom-left beam position to combine with component 2b'. Thus, at location 13, two composite output beams are formed. One composite output beam may be considered to contain the even channels, while the other may be considered to contain the odd channels of the communication signals.

The interleaver shown in FIG. 1 is thus equivalent a conventional one-stage Solc-type interleaver having the fast axis of the birefringent crystal thereof oriented at 45° with respect to the polarization direction of light input thereto. The equivalent birefringent crystal orientation provided by the one-stage interleaver of FIG. 1 is determined by the orientation of the half-wave waveplates 18 and 19. Thus, various different birefringent crystal orientations can similarly be simulated by varying the orientation of the half-wave waveplates 18 and 19.

Further, a plurality of stages, wherein each stage corresponds to and simulates to a separate birefringent crystal having a unique angular orientation of a fast axis thereof, can be provided by providing a plurality of birefringent filter stages 11, wherein birefringent filter stage has half-wave waveplates or the like thereof oriented so as to define the equivalent or simulated angular orientation corresponding to the desired angular orientation of a birefringent crystal. In this manner a plurality of stages, each stage having a unique angular orientation, can be provided so as to simulate a multi-crystal Solc-type birefringent filter (a multi-stage filter) having desired transmission characteristics. Thus, the interleaving function is obtained in a similar fashion to when a birefringent crystal Solc filter is utilized. The two output beams (1a', 2a' and 1b', 2b') are the two series of interleaved channels and the phase delay $\Gamma=L\cdot 2\pi/\lambda$, which determines the channel spacing.

According to one embodiment of the present invention, birefringence is obtained by optical path length differences, which may occur in free space. There are many advantages to the present invention as compared to conventional interleavers which utilize birefringent crystals. For example, the difference in optical path length can be manipulated so as to provided desired, comparatively high, birefringence values. An ultra low expansion (ULE) or fused silica may be utilized as a gasket in device construction, so as to obtain excellent temperature stability for the interleaver. Those skilled in the art will appreciate the various other materials having a very low thermal expansion coefficient are likewise suitable for use as such a gasket.

Because the beam shift is symmetric according to the present invention, the polarization mode dispersion mode is minimized.

Referring now to FIG. 3, interleavers having more than one birefringent filter stage may be utilized so as to enhance passband and stopband characteristics. As shown in FIG. 3, a two-stage interleaver comprises two birefringent filter stages in series with one another.

Figure 4:
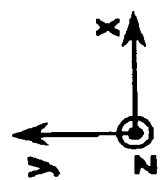
FIG. 4 is a series of frames showing the optical beam states and the half-wave waveplate orientations at different locations for the birefringent filter shown in FIG. 3.

Referring now to FIG. 4, the optical beam states and half-wave waveplate orientations for an exemplary two-stage birefringent filter or interleaver of FIG. 3 are shown. This interleaver corresponds to a Solc-type birefringent filter having birefringent crystal orientations of 45°, −21° and phase delay of $\Gamma$ and $2\Gamma$, respectively.

Referring now to FIG. 5, an interleaver having a three-stage birefringent filter is shown. The phase delay in the second stage and the third stage is twice as large as that for the first stage ($\Gamma_1=L\cdot 2\pi/\lambda$, $\Gamma_2=\Gamma_3=2L\cdot 2\pi/\lambda$). The interleaver channel spacing is determined by the phase delay in the first stage ($\Gamma_1$).

Figure 6:
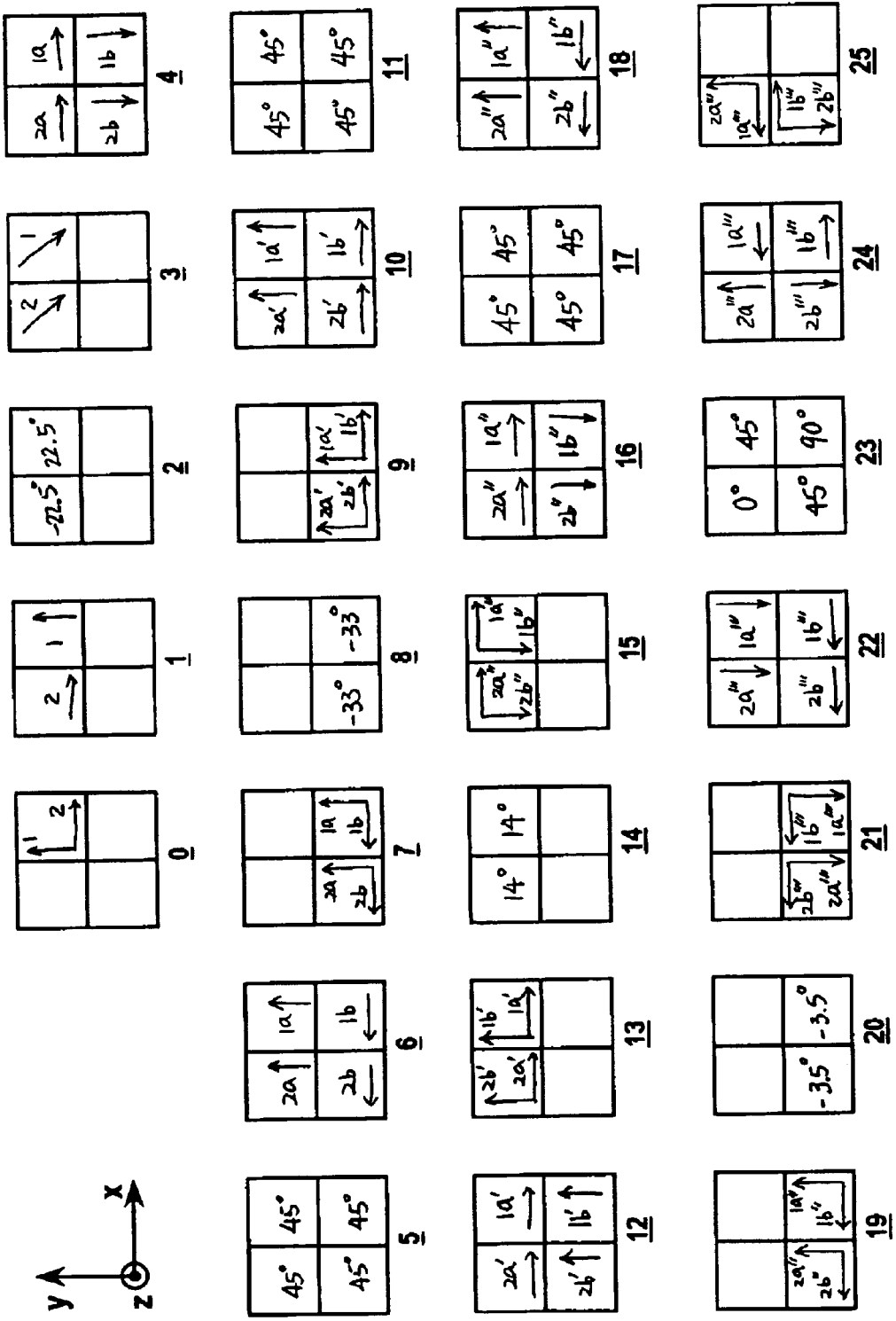
FIG. 6 is a series of frames showing the optical beam states and the half-wave waveplate orientations at different locations for the birefringent filter shown in FIG. 5.

Referring now to FIG. 6, the optical beam states and half-wave waveplate orientations for an exemplary three-stage birefringent filter of FIG. 5 are shown. This interleaver is equivalent to a Solc-type filter having birefringent crystal orientations of 45°, −21°, and 7° and having phase delay of $\Gamma$, $2\Gamma$ and $2\Gamma$, respectively.

In each configuration of the present invention, some of the half-wave waveplates may be eliminated by rotating the beam displacer orientation accordingly.

Thus, the interleaver of the present invention comprises a birefringent filter assembly coupled to receive at least two beams of polarized light. The birefringent filter assembly is configured so as to provide a birefringent effect with respect to the beams, without the use of birefringent crystals. Rather, the birefringent filter assembly provides a birefringent effect with respect to the beams by causing the beams to travel along two paths, wherein each path has a difference in optical path length.

One important aspect of this invention is the ability to control the difference in optical path length between the first and second paths, so that the birefringence value provided by this difference in optical path length does not vary undesirably during operation of the invention, such as due to temperature changes.

As those skilled in the art will appreciate, the birefringence values of a device determine the operational characteristics, i.e., transmission, dispersion, phase distortion, thereof. Therefore, it is very important that the optical path length differences (and consequently the birefringence values) remain substantially fixed during operation of the devices.

Portions of the first and second paths, other than the portions which contribute the optical path length differences, are less critical since these other portions do not determined birefringence values. Generally, portions of the first and second paths, other than the portions which contribute to the optical path length differences, tend to vary (changes in physical length and/or changes in index of refraction thereof) in response to environment (e.g., temperature) changes by approximately the same amount, due to structural similarity and symmetry of the first and second paths, and thus do not generally tend to change the path length difference. Therefore, it is that portion of the first and second paths (e.g., the L/2 or L portion shown in the Figs) which directly provides the difference in optical path length that must be most carefully controlled.

According to the present invention, the difference in optical path length between the first and second paths may optionally be controlled by inserting a material having desired optical, thermal and/or mechanical properties into at least the longer of the two paths, so as to substantially fix the optical path length which defines the difference between the first and second paths. Thus, by inserting such a material into at least that portion of one path that defines optical path length difference (e.g., the L/2 portion or the L portion of the path show in the figs.), substantially more stable operation of the devices is achieved.

Optionally, according to the present invention, those portions of the first and second paths which do not contribute to the optical path length difference comprise air, vacuum or any other material. Of course, these portions of the first and second paths are inherently equal in physical lengths to one another (since they do not contribute to the optical path length difference).

Further, the optical path lengths may be made so as to be variable, thus providing adjustability of the birefringence values and a tunable interleaver.

As used herein, the term gasket is defined to include any bracket, mount, optical bench, host, enclosure or any other structure which is used to maintain components of the present invention in desired positions relative to one another. Preferably, such gasket is comprised of an ultra low expansion (ULE) material, fused silica or any other material having a very low thermal expansion coefficient.

It will therefore be appreciated that it is comparatively easy to expand the multi-stage interleaver of the present invention to have any desired number of stages so as to facilitate and enhance interleaver performance.

Since no polarization beam splitter is used according to this configuration of the invention, both feedback to the input light source and transmission loss are mitigated.

Although-examples discussed above utilize equivalent birefringent filter element angles of 45°, 21° and 7° and utilize phase delays of $\Gamma$, $2\Gamma$ and $2\Gamma$, those skilled in the art will appreciate that various other angles and phase delays are likewise suitable. For example, phase delays of $\Gamma$, $2\Gamma$ and $\Gamma$ may alternatively be utilized.

The interleavers described herein are suitable for demultiplexing optical signals. Those skilled in the art will appreciate similar structures may be utilized to multiplex optical signals.

As those skilled in the art will appreciate, the waveplates which are utilized in the present invention can optionally be omitted in some instances by rotating subsequent components appropriately. Further, various devices and/or materials may alternatively be utilized to orient the polarization direction of light beams. For example, devices and/or materials which are responsive to applied voltages, currents, magnetic fields and/or electrical fields may be used to orient the polarization direction of light beams. Thus, the use of waveplates herein is by way of example only, and not by way of limitations.

Further, when waveplates having identical orientations are dispose next to one another, then a common waveplate may be substituted therefor.

It is understood that the exemplary interleaver described herein and shown in the drawings represent only a presently preferred embodiment of the present invention. Indeed, various modifications and additions may be made to such embodiment without departing from the spirit and scope of the invention. Those skilled in the art will appreciate that various different means for the defining the first and second paths, wherein each of the first and second paths have a different optical path length, are contemplated. Further, various different devices for separating the beams at each stage into separate components such that each component can travel along a different path, are likewise contemplated. Various means for recombining such separated components into composite beams are also contemplated. Thus, these and other modifications and additions may be obvious to those skilled in the art and may be implemented to adapt the present invention for the use of a variety of different applications.

What is claimed is:

1. An interleaver comprising:

an input polarization beam displacer;

a birefringent filter assembly in optical communication with the input polarization beam displacer, the birefringent filter assembly comprising at least one birefringent filter stage, each birefringent filter stage comprising:

a first filter polarization beam displacer; a second filter polarization beam displacer, at least one reflector configured to direct light from the first filter polarization beam displacer to the second filter polarization beam displacer;

a first output polarization beam displacer in optical communication with the birefringent filter assembly;

and a second output polarization beam displacer in optical communication with the first output polarization beam displacer.

2. The interleaver as recited in claim 1, wherein the reflector(s) comprise prisms.

3. The interleaver as recited in claim 1, wherein the reflector(s) comprise mirrors.

4. The interleaver as recited in claim 1, wherein the reflector(s) comprise two reflectors.

5. The interleaver as recited in claim 1, wherein:

the birefringent filter stage(s) define first and second paths; the reflector(s) comprise a single prism;

and further comprising a material disposed in at least one of the first and second paths, the material having an index of refraction which causes the first and second paths to have different optical path lengths.

6. The interleaver as recited in claim 1, wherein:

each birefringent filter stage further comprises at least a half-wave waveplate intermediate each reflector and the first or the second filter polarization beam displacer.

7. The interleaver as recited in claim 1, wherein:

each birefringent filter stage further comprises at least a half-wave waveplate disposed intermediate each reflector and the first or the second filter polarization beam displacer, each half-wave waveplate having an optical axis thereof oriented at approximately 45° with respect to a +x axis at that location.

8. The interleaver as recited in claim 1, further comprising:

a first input half-wave waveplate disposed intermediate the input polarization beam displacer and the birefringent filter assembly and configured so as to transmit a non-displaced beam therethrough;

and a second input half-wave waveplate disposed intermediate the input polarization beam displacer and the birefringent filter assembly and configured so as to transmit a displaced beam therethrough.

9. The interleaver as recited in claim 1, further comprising:

a first input half-wave waveplate disposed intermediate the input polarization beam displacer and the birefringent filter assembly and configured so as to transmit a non-displaced beam therethrough, the first input half-wave waveplate having an optic axis thereof oriented at approximately 22.5° with respect to a +x axis at that location;

and a second input half-wave waveplate disposed intermediate the input polarization beam displacer and the birefringent filter assembly and configured so as to transmit a displaced beam therethrough, the second input half-wave waveplate having an optic axis thereof oriented at approximately −22.5° with respect to a +x axis at that location.

10. The interleaver as recited in claim 1, further comprising at least a half-wave waveplate configured to receive an output of each birefringent filter assembly.

11. The interleaver as recited in claim 1, further comprising:
a half-wave waveplate configured to receive an output of a birefringent filter assembly, the half-wave waveplate having an optical axis angle of approximately −22.5° with respect to the +x axis at that location.

12. The interleaver as recited in claim 1, further comprising:
a half-wave waveplate of a first stage thereof configured to receive an output of a birefringent filter assembly, the half-wave waveplate having a optical axis angle of approximately −33° with respect to the +x axis at that location;
and a half-wave waveplate of a second stage thereof configured to receive an output of a birefringent filter assembly, the half-wave waveplate having a optical axis angle of approximately 10.5° with respect to the +x axis at that location.

13. The interleaver as recited in claim 1, further comprising:
a half-wave waveplate of a first stage thereof configured to receive an output of a birefringent filter assembly, the half-wave waveplate having a optical axis angle of approximately −33° with respect to the +x axis at that location;
a half-wave waveplate of a second stage thereof configured to receive an output of a birefringent filter assembly, the half-wave waveplate having a optical axis angle of approximately 14° with respect to the +x axis at that location;
and a half-wave waveplate of a third stage thereof configured to receive an output of a birefringent filter assembly, the half-wave waveplate having a optical axis angle of approximately −3.5° with respect to the +x axis at that location.

14. The interleaver as recited in claim 1, further comprising:
a first half-wave waveplate disposed intermediate the first output polarization beam displacer and the second output polarization beam displacer,
a second half-wave waveplate disposed intermediate the first output polarization beam displacer and the second output polarization beam displacer,
a third half-wave waveplate disposed intermediate the first output polarization beam displacer and the second output polarization beam displacer,
and a fourth half-wave waveplate disposed intermediate the first output polarization beam displacer and the second output polarization beam displacer.

15. The interleaver as recited in claim 1, further comprising:
a first half-wave waveplate disposed intermediate the first output polarization beam displacer and the second output polarization beam displacer, the first half-wave waveplate having an optic axis orientation of approximately QO with respect to the +x axis at that location;
a second half-wave waveplate disposed intermediate the first output polarization beam displacer and the second output polarization beam displacer, the second half-wave waveplate having an optic axis orientation of approximately 45° with respect to the +x axis of that location;
a third half-wave waveplate disposed intermediate the first output polarization beam displacer and the second output polarization beam displacer, the third half-wave waveplate having an optic axis orientation of approximately 45° with respect to the +x axis at that point;
and a fourth half-wave waveplate disposed intermediate the first output polarization beam displacer and the second output polarization beam displacer, the fourth half-wave waveplate having an optic axis orientation of approximately 90°.

16. The interleaver as recited in claim 1, wherein the birefringent filter assembly comprises one birefringent filter stage.

17. The interleaver as recited in claim 1, wherein the birefringent filter assembly comprises a plurality of birefringent filter stages.

18. The interleaver as recited in claim 1, wherein the birefringent filter assembly comprises two birefringent filter stages.

19. The interleaver as recited in claim 1, wherein the birefringent filter assembly comprises three birefringent filter stages.

20. The interleaver as recited in claim 1, wherein:
the filter polarization beam displacers and the reflector of each birefringent filter stage define two light paths wherein a difference in the first and second optical path lengths is provided by a material having an index of refraction greater than one which is disposed within at least a portion of one of the first and second paths.

21. The interleaver as recited in claim 1, wherein:
the filter polarization beam displacers and the reflector for each birefringent filter stage define two light paths wherein an index of refraction is different for at least a portion of the first and second paths, so as to cause the first and second paths to have different optical lengths.

22. The interleaver as recited in claim 1, wherein:
the input polarization beam displacer, the birefringent filter assembly, the first output polarization beam displacer and the second output polarization beam displacer are configured so as to facilitate interleaving of a plurality of beams simultaneously.

23. The interleaver as recited in claim 1, wherein:
the input polarization beam displacer, the birefringent filter assembly, the first output polarization beam displacer and the second output polarization beam displacer are configured so as to facilitate interleaving of a plurality of linearly arrayed beams simultaneously.

24. The interleaver as recited in claim 1, wherein the interleaver channels have spacing which is tunable.

* * * * *